United States Patent
Moon et al.

(10) Patent No.: US 12,291,469 B2
(45) Date of Patent: *May 6, 2025

(54) DIRECT WATER PURIFIER

(71) Applicant: WOONGJIN COWAY Co., Ltd., Gongju-si (KR)

(72) Inventors: Hyoung-Min Moon, Seoul (KR); Chul-Ho Kim, Seoul (KR); Hyun-Seok Moon, Seoul (KR); Hyun-Soo Shin, Seoul (KR); Byung-Sun Mo, Seoul (KR); Byoung-Phil Lee, Seoul (KR)

(73) Assignee: WOONGJIN COWAY Co., Ltd., Gongju-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,665

(22) Filed: Sep. 21, 2023

(65) Prior Publication Data
US 2024/0010526 A1   Jan. 11, 2024

Related U.S. Application Data

(63) Continuation of application No. 17/252,152, filed as application No. PCT/KR2019/007186 on Jun. 14, 2019, now Pat. No. 11,802,062.

(30) Foreign Application Priority Data

Jun. 15, 2018 (KR) .................. 10-2018-0068613

(51) Int. Cl.
*C02F 1/44* (2023.01)
*B01D 35/18* (2006.01)
(Continued)

(52) U.S. Cl.
CPC .............. *C02F 1/441* (2013.01); *B01D 35/18* (2013.01); *B01D 35/147* (2013.01); *C02F 1/008* (2013.01);
(Continued)

(58) Field of Classification Search
CPC .... C02F 1/441; C02F 1/008; C02F 2201/005; C02F 2209/02; C02F 1/02; B01D 35/18; B01D 35/147; B01D 61/02
See application file for complete search history.

(56) References Cited

FOREIGN PATENT DOCUMENTS

CN   105502579 A    4/2016
CN   106082510 A   11/2016
(Continued)

OTHER PUBLICATIONS

International Search Report issued on Sep. 23, 2019 in PCT/KR2019/007186 filed on Jun. 14, 2019, 2 pages.
(Continued)

*Primary Examiner* — Waqaas Ali
(74) *Attorney, Agent, or Firm* — Oblon, McClelland, Maier & Neustadt, L.L.P.

(57) ABSTRACT

A direct water purifier includes a first filter for filtering water introduced through a first flow path; a second filter for receiving the water supplied from the first filter through a second flow path and filtering the same; a first valve disposed in the second flow path to control water flow; a pump disposed in the second flow path to supply water having a predetermined hydraulic pressure or higher to the second filter; a third filter for receiving the water supplied from the second filter through a third flow path and filtering the same; a heating part for receiving the water supplied from the third filter and heating the same to a predetermined temperature; and a flushing valve disposed in a flushing flow path through which concentrated water is discharged from the second filter, wherein the flushing valve is opened during operation of the heating part.

1 Claim, 2 Drawing Sheets

(51) Int. Cl.
  *B01D 35/147*     (2006.01)
  *C02F 1/00*       (2023.01)
(52) U.S. Cl.
  CPC .... *C02F 2201/005* (2013.01); *C02F 2209/02* (2013.01)

(56) References Cited

FOREIGN PATENT DOCUMENTS

| | | | |
|---|---|---|---|
| CN | 205709995 U | | 11/2016 |
| CN | 107176651 A | | 9/2017 |
| CN | 107804922 A | | 3/2018 |
| CN | 109626466 A | | 4/2019 |
| JP | 2011-224467 A | | 11/2011 |
| KR | 19990018031 U | * | 6/1999 |
| KR | 10-2004-0031967 A | | 4/2004 |
| KR | 10-2010-0009984 A | | 1/2010 |
| KR | 10-2010-0122741 A | | 11/2010 |
| KR | 10-2016-0025949 A | | 3/2016 |
| KR | 20160099278 A | * | 8/2016 |
| KR | 10-2016-0142445 A | | 12/2016 |
| KR | 20160142477 A | * | 12/2016 |
| KR | 10-2017-0116808 A | | 10/2017 |
| KR | 101842036 B1 | * | 5/2018 |
| WO | WO-2018090834 A1 | * | 4/2019 .............. C02F 1/041 |

OTHER PUBLICATIONS

Combined Chinese Office Action and Search Report issued Dec. 3, 2021 in corresponding Chinese Patent Application No. 201980040206.8 (with English Translation), 17 pages.

* cited by examiner

DIRECT WATER PURIFIER

CROSS-REFERENCE TO RELATED APPLICATIONS

This application is a continuation of and claims priority to U.S. patent application Ser. No. 17/252,152, filed Dec. 14, 2020, the entire contents of which are incorporated herein by reference. Application Ser. No. 17/252,152 is a National Stage Application of International Application No. PCT/KR2019/007186, filed Jun. 14, 2019, which claims priority to Korean Patent Application No. 10-2018-0068613, filed Jun. 15, 2018. The benefit of priority is claimed to each of the foregoing.

TECHNICAL FIELD

The present disclosure relates to a direct water purifier.

BACKGROUND ART

A water purifier is a device for purifying raw water supplied from an external source to provide purified water. In accordance with increasing demand of users for fresher water and a trend of miniaturization of products, a direct water purifier without a storage tank has been widely used. A water purifier which generates and provides cold water and hot water using purified water, in addition to providing purified water, has also been widely used.

In the case of instantaneously operating a hot water heater to provide hot water in a direct water manner, however, pressure of a pump disposed in a flow path of the water purifier may increase excessively as a flow rate is adjusted to heat the purified water to a desired temperature, leading to reduced durability of the product.

DISCLOSURE

Technical Problem

Accordingly, there is a need in the art for a method for preventing an excessive increase in pump pressure when a hot water heater is instantaneously operated, with respect to a direct water purifier providing purified water, cold water and hot water in a direct water manner.

Technical Solution

To solve the technical problem, an embodiment provides a direct water purifier.

The direct water purifier includes a first filter for filtering water introduced through a first flow path; a second filter for receiving the water filtered by and supplied from the first filter through a second flow path and filtering the same; a first valve disposed in the second flow path to control water flow; a pump disposed in the second flow path to supply water having a predetermined hydraulic pressure or higher to the second filter; a third filter for receiving the water filtered by and supplied from the second filter through a third flow path and filtering the same; a heating part for receiving the water filtered by and supplied from the third filter and heating the same to a predetermined temperature; and a flushing valve disposed in a flushing flow path through which concentrated water is discharged from the second filter, wherein the flushing valve is open during operation of the heating part.

In addition, the means for solving the above-mentioned technical problem are not all enumerating the features of the present disclosure. The various features of the present disclosure and the advantages and effects thereof will be more fully understood by reference to the following specific embodiments.

Advantageous Effects

According to an embodiment of the present disclosure, an excessive increase in pump pressure of a direct water purifier providing purified water, cold water and hot water in a direct water manner can be prevented when a hot water heater is instantaneously operated.

BEST MODE FOR INVENTION

Figure 1:
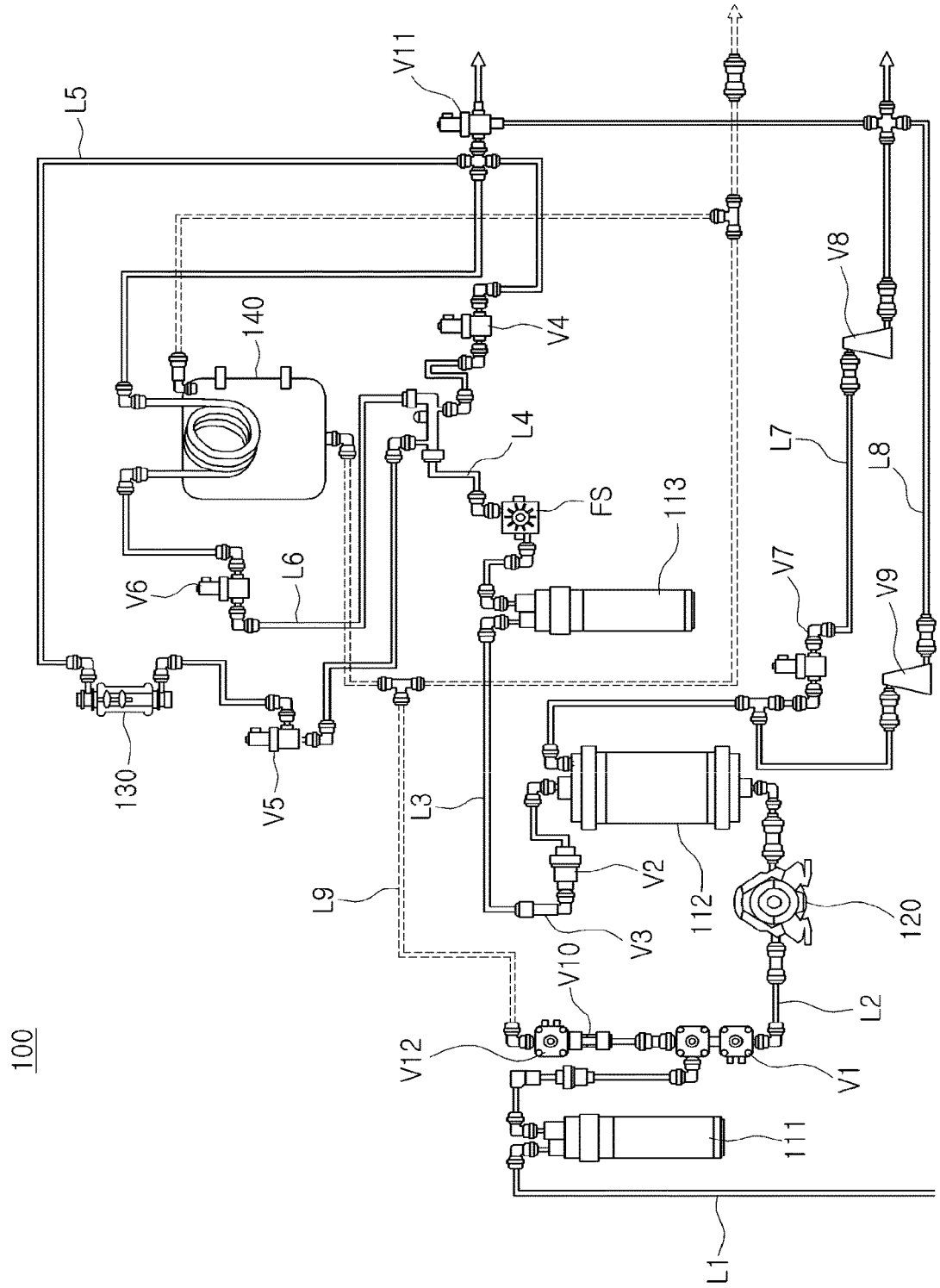
FIG. 1 is a diagram illustrating a configuration of a direct water purifier according to an embodiment of the present disclosure.

Hereinafter, preferred embodiments of the present invention will be described in detail with reference to the accompanying drawings. The invention may, however, be exemplified in many different forms and should not be construed as being limited to the specific embodiments set forth herein, and those skilled in the art and understanding the present invention can easily accomplish retrogressive inventions or other embodiments included in the scope of the present invention by the addition, modification, and removal of components within the same scope, but those are construed as being included in the scope of the present invention. Like reference numerals will be used to designate like components having similar functions throughout the drawings within the scope of the present disclosure.

Throughout the specification, a configuration is referred to as being "connected" to another configuration, including not only when the configurations are directly connected but also when they are indirectly connected with each other. In addition, when a component is referred to as "comprise" or "comprising," it means that it may include other components as well, rather than excluding other components, unless specifically stated otherwise.

FIG. 1 is a diagram illustrating a configuration of a direct water purifier according to an embodiment of the present disclosure.

Referring to FIG. 1, a direct water purifier 100 according to an embodiment of the present disclosure may be configured to include one or more filters 111 to 113, a pump 120, a heating part 130 and a cooling part 140, flow paths connecting the same L1 to L9, valves disposed in the flow path to control water flow V1 to V12, and a flow rate sensor FS.

Raw water provided through the first flow path L1 can be filtered in the first filter 111. For example, the first filter 111 may be a pre-treatment filter first filtering the raw water.

The water filtered by the first filter 111 may flow to the second flow path L2 through the first valve V1. For example, the first valve V1 may be implemented as a diaphragm valve allowing the water filtered in the first filter 111 to flow to the second flow path L2.

The water having flowed through the second flow path L2 may be provided to and filtered by the second filter 112. For example, the second filter 112 may be a reverse osmosis filter which filters water by a reverse osmosis (RO) method.

Further, the pump 120 is provided in the second flow path L2 such that water having a predetermined hydraulic pressure or higher can be supplied to the second filter 112. This enables the water filtration by the RO method to be smoothly carried out in the second filter 112.

The water filtered by the second filter 112 may be provided to the third filter 113 through the third flow path L3 and filtered therein. For example, the third filter 113 may be a post-treatment filter for removing gas, odor, residual chlorine, and the like.

The second valve V2 for pressure drop in the flow paths and the third valve V3 for preventing backflow of water may be provided on the third flow path L3.

Meanwhile, concentrated water discharged from the second filter 112 may be discharged to a drain through the seventh flow path L7 or may be provided as living water through the eighth flow path L8.

The seventh valve V7 and the eighth valve V8 for performing a flushing may be provided on the seventh flow path L7, and the ninth valve V9 may be provided on the eighth flow path L8. The seventh flow path L7 and the seventh valve V7 are provided for performing the flushing and may be referred to as a flushing flow path and a flushing valve, respectively. In addition, when the heating part 130 to be described later is being operated, the seventh valve V7 may be open to prevent an excessive increase in rear end pressure of the pump 120 or a front end of the second filter 112 when an extraction amount of purified water filtered through the second filter 112 is limited. When the second filter 112 is completely open, however, pressure is not formed in the second filter 112, and thus, a water purification function may be lost. Accordingly, in order to solve the problem of a complete opening of the second filter 112, the eighth valve V8 and the ninth valve V9 formed as resistors on the eighth flow path L8 and on a rear end of the seventh valve V7 on the seventh flow path L7, respectively, are installed to form driving pressure required for the second filter 112.

Further, the seventh valve V7 may be open the seventh flow path L7 while the heating part 130 to be described later is being operated. Accordingly, it is possible to prevent an excessive increase in pressure of the pump 120 when the heating part 130 is being operated.

The purified water filtered by the third filter 113 is supplied to a user through the fourth flow path L4, heated while passing through the fifth flow path L5 branched from the fourth flow path L4, or supplied to the user after being cooled while passing through the sixth flow path L6 branched from the fourth flow path L4.

The flow rate sensor FS is provided on the fourth flow path L4 to detect a flow rate of the purified water flowing through the fourth flow path L4. In addition, the fourth valve V4 is provided on the fourth flow path L4 to control purified water supply through the fourth flow path L4.

The fifth valve V5 and the heating part 130 may be provided on the fifth flow path L5. The heating part 130 may be an instantaneous hot water heater, which instantaneously heats inflowing purified water to a predetermined temperature. The fifth valve V5 is provided at a front end of the heating part 130 to control supply of hot water supply through the fifth flow path L5 and may be referred to as a hot water valve. For example, the fifth valve V5 may be implemented as a stepping motor to adjust a flow rate of the purified water supplied to the heating part 130 such that the purified water supplied to the heating part 130 is heated to be hot water having a predetermined temperature.

The sixth valve V6 and the cooling part 140 may be provided on the sixth flow path L6. The cooling part 140 may provide cold water by cooling purified water introduced in an ice-storing manner. For example, the cooling part 140 may include an ice storage tank and a cooling coil and can instantaneously cool the purified water introduced by heat exchange after cooling non-drinking water in the ice storage tank by the cooling coil. The sixth valve V6 may be provided at a front end of the cooling part 140 to control cold water supply through the sixth flow path L6.

In addition, the eleventh valve V11 may be provided at a water outlet in which the fourth flow path L4, the fifth flow path L5 and the sixth flow path L6 are combined. For example, the eleventh valve V11 is implemented as a two-way valve such that water discharged through the fourth flow path L4, the fifth flow path L5 or the sixth flow path L6 is supplied to the user or is discharged to the drain.

Meanwhile, the water filtered by the first filter 111 may flow through the ninth flow path L9 and be supplied to the ice storage tank provided in the cooling part 140 or discharged externally. The tenth valve V10 and the twelfth valve V12 may be provided on the ninth flow path L9 branched from a rear end of the first filter 111. For example, the tenth valve V10 may be implemented as a check valve for preventing backflow of water, while the twelfth valve V12 may be implemented as a diaphragm valve.

Figure 2:
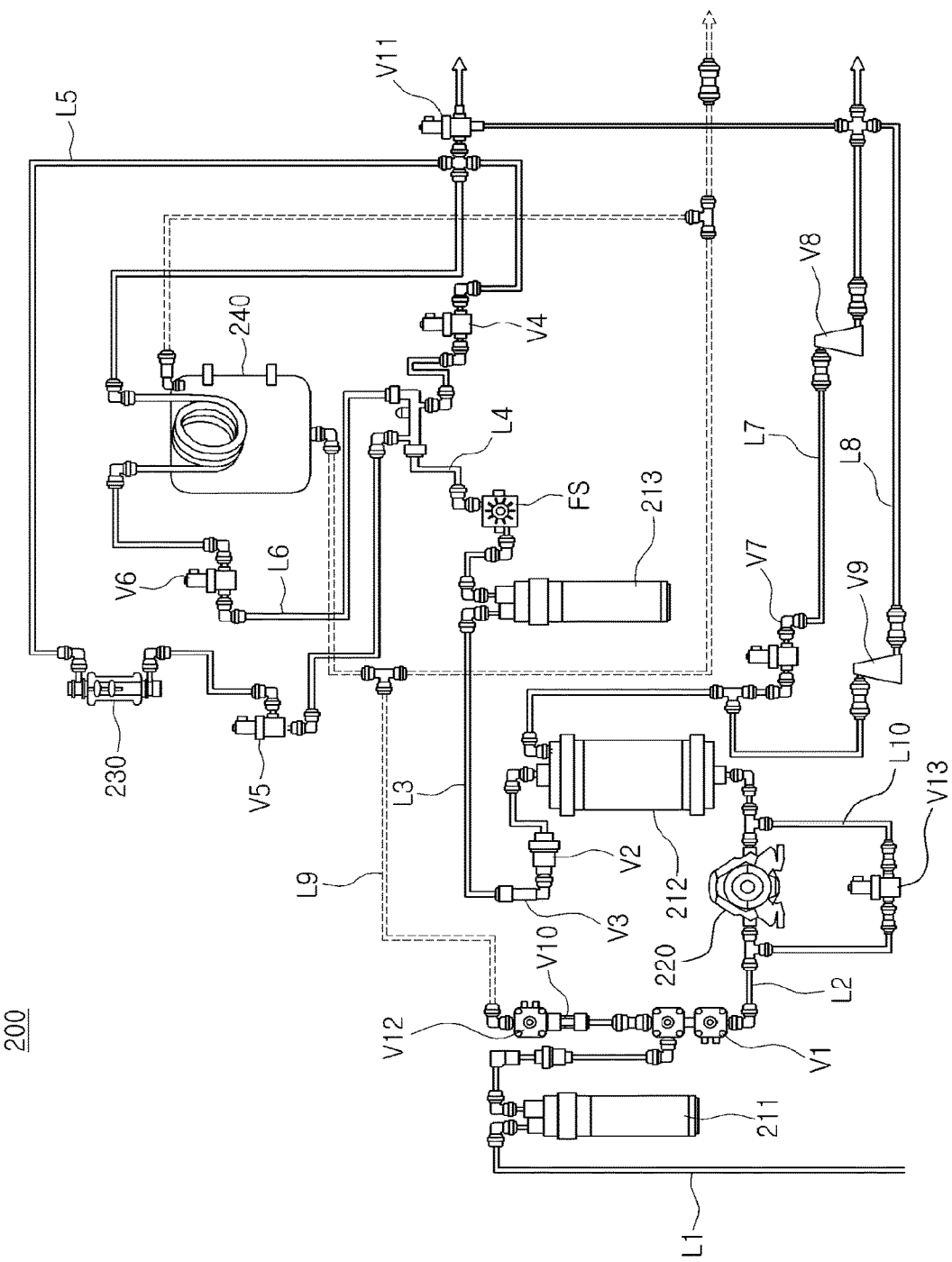
FIG. 2 is a diagram illustrating a configuration of a direct water purifier according to another embodiment of the present disclosure.

FIG. 2 is a diagram illustrating a configuration of a direct water purifier according to another embodiment of the present disclosure.

Referring to FIG. 2, a direct water purifier 200 according to another embodiment may be configured to include one or more filters 211 to 213, a pump 220, a heating part 230 and a cooling part 240, flow paths L1 to L10 connecting the same, valves disposed in the flow paths to control water flow V1 to V13 and a flow rate sensor FS.

The direct water purifier 200 illustrated in FIG. 2 are the same as the direct water purifier 100 illustrated in FIG. 1 except that a tenth flow path L10 connecting a front end and a rear end of the pump 220 to bypass the pump 220 and a thirteenth valve 13 disposed in the tenth flow path L10 are further included. Descriptions of the same elements will be omitted.

The tenth flow path L10 and the thirteenth valve V13 are for bypassing the front and rear ends of the pump 220 and may be referred as a bypass flow path and a bypass valve, respectively.

The thirteenth valve V13 may open the tenth flow path L10 while the heating part 230 is being operated. In this regard, it is possible to prevent an excessive increase in pressure of the pump 220 when the heating part 230 is being operated. In addition, the thirteenth valve V13 may prevent an increase in the pressure of the pump 220 by opening the tenth flow path L10 when an overload in the pump 220 is detected by an additionally provided sensor, or the like.

While the present invention has been described with reference to exemplary embodiments in the present disclosure is not limited thereto, but various modifications may be made within the technical ideas of the present disclosure.

The invention claimed is:
1. A direct water purifier, comprising:
a filter for filtering water;
a pump for supplying water having a predetermined hydraulic pressure or higher to the filter;

a heater configured to heat purified water inflowing by hydraulic pressure of the pump to a predetermined temperature and discharging the heated water;

a hot water valve adjusting a flow rate of the purified water supplied to the heater such that the purified water supplied to the heater is heated to be hot water having a predetermined temperature; and a flushing valve disposed in a flushing flow path through which concentrated water is discharged from the filter, wherein the flushing valve opens the flushing flow path during the purified water flowing at a flow rate controlled by the hot water valve is heated by the heater, wherein the direct water purifier further comprises an eighth valve formed as resistors on an eighth flow path, and a ninth valve formed as resistors on a rear end of a seventh valve on a seventh flow path, the seventh valve being directly connected to the filter to prevent excessive pressure rise at the pump.

\* \* \* \* \*